(12) United States Patent
Kumar

(10) Patent No.: US 9,334,851 B2
(45) Date of Patent: May 10, 2016

(54) METHOD OF CONTROLLING A WIND TURBINE

(71) Applicant: Siemens Aktiengesellschaft, Munich (DE)

(72) Inventor: Sathees Kumar, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/455,996

(22) Filed: Aug. 11, 2014

(65) Prior Publication Data

US 2015/0076824 A1    Mar. 19, 2015

(30) Foreign Application Priority Data

Sep. 18, 2013    (EP) .................................. 13184941

(51) Int. Cl.
| | |
|---|---|
| *H02P 9/00* | (2006.01) |
| *F03D 7/02* | (2006.01) |
| *F03D 7/04* | (2006.01) |
| *H02J 3/38* | (2006.01) |
| *H02J 3/18* | (2006.01) |

(52) U.S. Cl.
CPC ............... *F03D 7/0284* (2013.01); *F03D 7/048* (2013.01); *H02J 3/18* (2013.01); *H02J 3/386* (2013.01); *F05B 2270/1071* (2013.01); *F05B 2270/337* (2013.01)

(58) Field of Classification Search
CPC ...................................... H02J 3/18; H02P 9/00
USPC .......................................................... 290/44
See application file for complete search history.

(56) References Cited

U.S. PATENT DOCUMENTS

| | | | | |
|---|---|---|---|---|
| 5,083,039 | A | * | 1/1992 | Richardson et al. ............ 290/44 |
| 7,471,011 | B2 | | 12/2008 | Janssen |

(Continued)

FOREIGN PATENT DOCUMENTS

| | | | | |
|---|---|---|---|---|
| EP | 1508951 | A1 * | 2/2005 | ................ H02J 3/18 |
| EP | 1855367 | A1 * | 11/2007 | ................ F03D 9/00 |

(Continued)

OTHER PUBLICATIONS

Feltes, C.; Engelhardt, S.; Kretschmann, J.; Fortmann, J.; Koch, F.; Erlich, I.: "High Voltage Ride-Through of DFIG-based Wind Turbines", 2008 IEEE Power and Energy Society General Meeting—Conversion and Delivery of Electrical Energy in the 21st Century, Journal Paper (English) 2008.

*Primary Examiner* — Joseph Waks
(74) *Attorney, Agent, or Firm* — Buesse Wolter Sanks & Maire

(57) ABSTRACT

A method of controlling a wind turbine in response to an overvoltage event in an electricity grid to which the wind turbine is connected is provided, which method includes the steps of controlling at least one auxiliary device to increase its consumption of reactive power, wherein an auxiliary device is a device used during normal operation of the wind turbine; and/or controlling at least one reactive power generating device to decrease its generation of reactive power, wherein a reactive power generating device is a device that generates reactive power during normal operation of the wind turbine. An overvoltage response arrangement adapted for controlling a wind turbine in response to an overvoltage event in an electricity grid to which the wind turbine is connected is also provided. A wind turbine having an overvoltage response arrangement and a wind park are also provided.

18 Claims, 2 Drawing Sheets

(56) References Cited

U.S. PATENT DOCUMENTS

| | | | |
|---|---|---|---|
| 2003/0006613 A1* | 1/2003 | Lof et al. | 290/44 |
| 2005/0194944 A1* | 9/2005 | Folts et al. | 323/209 |
| 2007/0052244 A1 | 3/2007 | Hudson | |
| 2010/0314872 A1* | 12/2010 | Wagoner et al. | 290/44 |
| 2011/0089694 A1 | 4/2011 | Matsushita | |
| 2012/0049807 A1* | 3/2012 | Hehenberger | 322/40 |
| 2012/0104754 A1* | 5/2012 | Rudolf | F03D 7/0284 290/44 |
| 2012/0133133 A1 | 5/2012 | Nielsen | |
| 2012/0280569 A1* | 11/2012 | Alam et al. | 307/60 |
| 2014/0112038 A1* | 4/2014 | Hasler | H02M 1/32 363/56.05 |
| 2014/0225370 A1* | 8/2014 | Mayer et al. | 290/44 |
| 2014/0307488 A1* | 10/2014 | Brogan et al. | 363/35 |
| 2015/0077067 A1* | 3/2015 | Kanjiya | H02H 7/067 322/21 |

FOREIGN PATENT DOCUMENTS

| | | |
|---|---|---|
| EP | 2224129 A2 | 9/2010 |
| WO | 2013044922 A1 | 4/2013 |

* cited by examiner

METHOD OF CONTROLLING A WIND TURBINE

CROSS REFERENCE TO RELATED APPLICATIONS

This application claims priority to and the benefit of European Application No. EP13184941 filed Sep. 18, 2013, incorporated by reference herein in its entirety.

FIELD OF INVENTION

The invention describes a method of controlling a wind turbine in response to an overvoltage event. The invention also describes an overvoltage response arrangement; a wind turbine; and a wind park.

BACKGROUND OF INVENTION

A wind park can comprise any number of wind turbines for generating electrical power and feeding this into an electrical grid. Usually, the operator of a wind park must ensure that the wind park is operated according to the applicable regulations or grid code. The grid code can define various aspects of the performance of the wind park, for example the reaction to a fault on the grid side or wind park side. There are various types of fault, and the wind park must be able to respond reliably and quickly in each case in order to avoid sanctions in case of non-compliance. For example, the wind park must be able to respond to a low-voltage or overvoltage event. Such an event can happen at any time as a result of an instability or fault in the electrical grid. In prior art solutions, a wind turbine may be equipped with a circuit breaker that trips during an excessively high grid-side voltage, in order to disconnect the wind turbine with the aim of avoiding damage to the wind turbine components. However, disconnection and subsequent re-connection of the wind turbine generator effectively prolong the instability of the grid. Therefore, newer grid codes may stipulate that the wind turbines of a wind park remain connected during an overvoltage event in order to be able to support the grid to resume normal operation as quickly as possible. To deal with this requirement, it has been proposed to equip each wind turbine with a full-scale power converter that is capable of absorbing reactive power. During an overvoltage event, such power converters absorb reactive power and effectively act to "pull down" the voltage, while protecting the wind turbine. For example, if such a power converter is already producing reactive power when an overvoltage event occurs, it will stop producing reactive power and start absorbing it instead. To this end, a suitable controller is required to control the operation of the power converter. However, equipping each wind turbine with such an additional expensive component significantly adds to the overall cost of a wind park. Furthermore, for reliable overvoltage response at all times, the power converter must be realised to absorb a maximum reactive power level, for example when an overvoltage event occurs while the wind turbine is operating at full rated output.

SUMMARY OF INVENTION

It is therefore an object of the invention to provide a more economical yet reliable and straightforward way of responding to an overvoltage event.

This object is achieved by the method of controlling a wind turbine; by the overvoltage response arrangement; by the wind turbine; and by the wind park according to the independent claims.

According to aspects of the invention, the method of controlling a wind turbine in response to an overvoltage event in an electricity grid comprises the steps of detecting the overvoltage event in the electricity grid to which the wind turbine is connected; and controlling at least one auxiliary device to increase its consumption of reactive power, wherein an auxiliary device comprises a device of the wind turbine used during normal operation of the wind turbine, and/or controlling at least one reactive power generating device to decrease its generation of reactive power, wherein a reactive power generating device comprises a device that generates reactive power during normal operation of the wind turbine.

Here, the expression "normal operation of the wind turbine" is to be understood to mean the usual operation when the wind turbine is delivering power to the grid. An advantage of the method according to the invention is that a quick and straightforward response to the overvoltage event can be obtained simply by operating one or more of the wind turbine's auxiliary devices (which are available anyway) to absorb more reactive power and/or by controlling one or more reactive power generating devices (which are available anyway) to deliver less reactive power or even to stop delivering reactive power. This reaction may be sufficient to prevent a wind turbine from "tripping", i.e. disconnecting from the grid, so that the wind turbine remains available to assist in stabilizing the grid after such an overvoltage event. Furthermore, since the auxiliary devices and the reactive power generating devices are already part of the wind turbine, the method according to the invention is not associated with any significant expense. The method according to the invention may be regarded as a type of "override" in which normal control of these devices is interrupted, and instead they are controlled in response to an overvoltage event so that the wind turbine can absorb reactive power and/or reduce or even temporarily cease its own production of reactive power. A wind turbine can therefore be controlled to simply and effectively respond to the overvoltage event. A response to an overvoltage event in a high voltage (HV) or medium voltage (MV) part of the overall grid network can therefore be effected at the low voltage (LV) side, namely within one or more wind turbines of a wind park.

According to aspects of the invention, the overvoltage response arrangement is realised for controlling a wind turbine in response to an overvoltage event in an electricity grid, and comprises an overvoltage detector realised to detect an overvoltage event in an electricity grid to which the wind turbine is connected and a controller for controlling at least one auxiliary device (or just "auxiliary") to increase its consumption of reactive power, and/or for controlling at least one reactive power generating device to decrease its generation of reactive power. As explained above, an auxiliary device comprises a device that assists the wind turbine during normal operation, and a reactive power generating device comprises a device that generates reactive power during normal operation.

An advantage of the overvoltage response arrangement according to the invention is that it can be realised in a relatively straightforward manner, without requiring additional expensive components such as a power converter for a wind turbine. Instead, the overvoltage response arrangement is favourably realised to make the most of the inherent capabilities of devices that are in any case already required for normal operation of the wind turbine.

According to aspects of the invention, the wind turbine comprises such an overvoltage response arrangement according to the invention.

An advantage of the wind turbine according to the invention is that it can itself be controlled or operated by its overvoltage response arrangement to assist in reacting to an overvoltage event and to avoid disconnecting the wind turbine from the grid. Furthermore, an existing wind turbine can be adapted or upgraded with relatively little effort and low cost to include such an overvoltage response arrangement, so that the wind turbine can assist in responding to future strict grid code requirements.

According to aspects of the invention, the wind park comprises a plurality of wind turbines realised to feed into an electricity grid; and a wind park controller for controlling the plurality of wind turbines, wherein the wind park comprises an overvoltage response arrangement according to the invention realised to control a number of auxiliary devices of a number of the wind turbines to increase their consumption of reactive power and/or to control a number of reactive power generating devices of a number of the wind turbines to decrease their generation of reactive power in response to the overvoltage event.

An advantage of the wind park according to the invention is that the inherent reactive power absorption capacity of the auxiliary devices of one, several, or even all of the wind turbines can be used to good effect in responding to an overvoltage event; the same applies to the inherent possibilities of reducing the overall reactive power generation by the reactive power generating devices of one, several, or even all of the wind turbines. Furthermore, if the wind park is realised so that the auxiliary devices and/or the reactive power generating devices of some or all of the wind turbines can be controlled by one or more overvoltage response arrangements, these devices can be directly controlled to assist in an overvoltage ride-through procedure. Another advantage of such a wind park is that information about the reactive power consumption or generation capacities of the individual turbines—in the run-up to an overvoltage event or directly preceding the overvoltage event—may already be monitored and collected for use in normal operation of the wind turbines of the wind park, and this information can be put to good use directly in responding to an overvoltage event.

Particularly advantageous embodiments and features of the invention are given by the dependent claims, as revealed in the following description. Features of different claim categories may be combined as appropriate to give further embodiments not described herein.

In the following, without restricting the invention in any way, it may be assumed that an auxiliary device of a wind turbine comprises any device such as a pump of a cooling arrangement of the wind turbine, a dehumidifier of the wind turbine, a lighting system of the wind turbine, etc. or any device that assists in the running of the wind turbine during normal operation. Drivers and/or motors of such devices generally comprise a number of inductive and/or capacitive components that absorb reactive power. An example of a reactive power generating device of a wind turbine can be a PWM (pulse-width modulation) filter usually used to remove certain frequencies such as harmonics from the wind turbine's output voltage.

The devices that are running during operation of a wind turbine may be collectively regarded as contributors to an internal or "local" power system of that wind turbine. The collective reactive power level of this local power system will depend to a large extent on the amount of reactive power being generated by some devices and absorbed by others. The reactive power level of the wind turbine also determines the amount of reactive power that could be "injected" into that local power system from outside, i.e. the amount of reactive power that the wind turbine is capable of absorbing or consuming.

The step of controlling a device to increase its power consumption or decrease its generation of reactive power may be performed on the basis of a power estimation for that device, which power estimation is determined during normal operation of the wind turbine. For example, a wind turbine controller may in any case be realised to track the performance of any auxiliary, for example to monitor the performance of a cooling arrangement. Such information may be used for other purposes, for example to regulate the normal performance of the auxiliary, to schedule a maintenance or service procedure, etc. The method according to the invention can utilise such information to determine how much "headroom" is available in the local power system to respond to an overvoltage event. For example, if an auxiliary is only running at 40% of its rated power, the method according to the invention can "use" the remaining 60% by immediately driving that auxiliary at full power, effectively consuming reactive power within the local power system and lowering the cumulative reactive power level of the wind turbine. This may be enough to prevent tripping of the wind turbine during the overvoltage event, so that the wind turbine remains connected and can contribute actively to stabilizing the grid.

A known approach in reacting to an overvoltage is to provide an additional dedicated device that is able to absorb or consume the excess reactive power associated with an overvoltage event. For example, several banks of inductors may be arranged at some point in the wind park or between the wind park and the grid. A prior art response to an overvoltage event can comprise activation of some or all of the inductor banks. Clearly, the prior art solution is costly, since the inductor banks must be dimensioned to deal with a worst-case overvoltage event, even though these may only infrequently required. The method according to the invention uses a different approach, namely to combine the capacity of various devices used in normal operation of the wind turbine(s) to absorb reactive power or to reduce reactive power output. By combining resources in this way, the method according to the invention can do away with the need for a dedicated inductor bank. Of course, a back-up inductor bank could be implemented for added safety, or an existing inductor bank can be included. For example, a reactor bank may already be incorporated between a HV and MV part of the grid. A wind park connected to this grid and equipped with an overvoltage response arrangement according to the invention may be realised to also activate the reactor bank, for example depending on the severity of the overvoltage event and/or depending on how much power can be absorbed by the auxiliaries of the wind turbines and how much reactive power can be suppressed by shutting down or disconnecting devices such as the PWM filters of one or more wind turbines.

The method according to aspects of the invention can involve an "automatic" or straightforward response to an overvoltage event. For example, when an overvoltage event is detected, the overvoltage response arrangement can react by immediately driving all auxiliaries at maximum power, and shutting down or disconnecting any device (apart from the generator itself) that is delivering reactive power. In an alternative approach, the overvoltage response arrangement comprises some means of determining an "excess" quantity of reactive power that must be dealt with as a result of the overvoltage event. The determined quantity may then be used as a basis for deciding how to control the auxiliaries (for example, whether all of them need to be driven to consume more power, or whether any of them needs to be driven at maximum power, etc.) and how to control the reactive power generating devices (for example, whether it is sufficient to reduce the power output of such a device or whether it is indeed necessary to shut it down).

The steps of the method may be performed to prevent a disconnection of the wind turbine from the grid. To this end, the overvoltage response arrangement is realised to react very quickly and to control the auxiliaries and reactive power generation devices to rapidly obtain an active/reactive power balance that is sufficient to prevent the wind turbine's circuit breaker from disconnecting the wind turbine from the grid.

In a wind turbine, devices are generally interconnected by means of a voltage bus, for example a low-voltage bus, so that the devices can all be powered from a common power supply. In a further embodiment of the invention, therefore, an estimation unit of the overvoltage response arrangement determines the reactive power absorption capacity of an auxiliary device of the wind turbine on the basis of a voltage measured at the low-voltage bus.

In a similar manner, the devices of a wind turbine may be interconnected by a communications bus for transferring commands and data between the devices and a wind turbine controller. The controller of the overvoltage response arrangement according to the invention may make use of such a communications bus, and can control the auxiliaries and/or reactive power generating devices by issuing appropriate commands over such a communications bus.

A quick reaction can be achieved by monitoring the performance of the devices so that an estimation of their capabilities is available to the overvoltage response arrangement at any time. To this end, in a further embodiment of the invention, the overvoltage response arrangement comprises a power estimation unit or module for determining a reactive power absorption capacity of an auxiliary device of the wind turbine during normal operation of the wind turbine. Depending on the percentage of rated capacity at which an auxiliary is running, such a power estimation unit can record the remaining percentage that would be available in the event of an overvoltage fault in the grid. For example, if an interior lighting arrangement such as a halogen or LED arrangement is turned off—i.e. the lighting arrangement is effectively operating at close to 0% capacity—all the lights can immediately be turned on when an overvoltage event occurs, so that the lighting arrangement is effectively operating at 100% capacity. The reactive power absorbed by such a lighting arrangement can be significant, for example if the tower interior is equipped with lights over its entire height. The controller of an overvoltage response arrangement may be realised to drive an auxiliary device at maximum power in response to the overvoltage event.

Similarly, in an embodiment of the invention, the overvoltage response arrangement comprises a power estimation unit for determining a reactive power generation capacity of a reactive power generating device of the wind turbine during normal operation of the wind turbine. For example, the reactive power delivered into the local power system by a wind turbine's PWM filter may depend on the grid voltage at that LV side, for example the voltage at the point of common connection of a wind park. The power generation estimation unit can keep track of the reactive power generated by such a PWM filter, so that it can determine the net reactive power that could be "disposed of" by temporarily disconnecting this PWM filter during an overvoltage ride-through. The controller of an overvoltage response arrangement can completely disconnect such a PWM filter for the duration of the overvoltage ride-through or for a predefined time duration following the overvoltage event.

In addition to the steps described above, an overvoltage response arrangement can perform any other appropriate action that can help prevent a tripping of the wind turbine. For example, the wind turbine generator itself feeds reactive power into the system. Therefore, any measure that reduces the level of this reactive power contribution may help avoid tripping the wind turbine. In a further embodiment of the invention, the controller is realised to adjust a control parameter of the wind turbine generator to reduce the reactive power output of the generator. The control parameter may comprise a blade pitch angle, and the controller is realised to pitch the blades out of the wind in response to the overvoltage event, so that the generator torque is reduced, and the generator delivers less reactive power.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the diagrams, like numbers refer to like objects throughout. Objects in the diagrams are not necessarily drawn to scale.

DETAILED DESCRIPTION OF INVENTION

Figure 1:
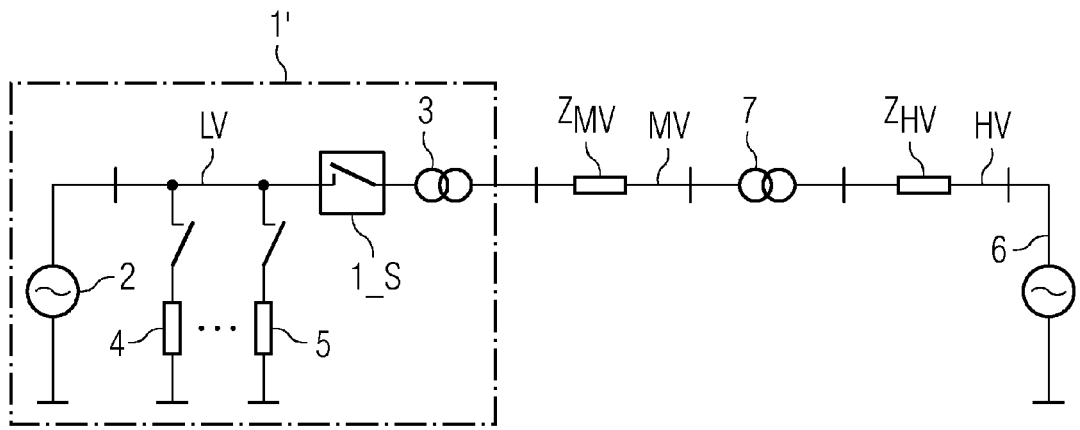
FIG. 1 shows a schematic representation of a wind turbine connected to a grid.

FIG. 1 shows a simplified schematic representation of a prior art wind turbine 1' realised to supply electricity to a utility grid 6. Of course, there may be any number of wind turbines 1' feeding power into the grid 6. The wind turbine 1' comprises a generator 2 for generating electricity, which is fed into a wind park medium voltage line MV via a wind turbine transformer 3. The wind park medium voltage line MV feeds the collective power from any number of wind turbines 1' into the high voltage line HV at a point of common connection via a park transformer 7. The high voltage lines can comprise an overhead line or DC line to deliver the power to the utility grid 6 where it is consumed. The diagram indicates the subdivisions into various grid regions LV, MV, HV and associated impedances $Z_{MV}$, $Z_{HV}$. The components of the wind turbine 1' relevant to this explanation and shown in the bounding box are the wind turbine generator 2 along with any number of other reactive power generation devices 4 and auxiliary devices 5, which may collectively be regarded as a "local power system" of the wind turbine 1'. The wind turbine 1 is equipped with a circuit breaker 1_S that can be opened in the event of an overvoltage, in order to protect the devices 2, 4, 5 from damage.

Figure 2:
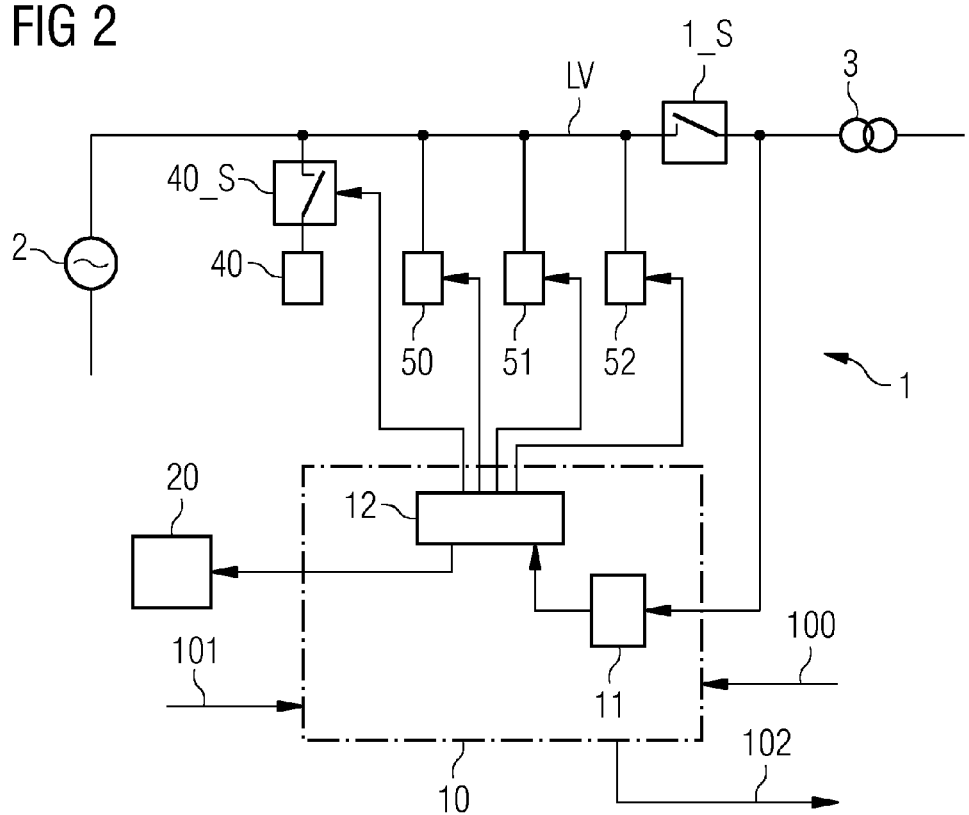
FIG. 2 shows a schematic representation of a wind turbine according an embodiment of the invention.

FIG. 2 shows a simplified schematic representation of a wind turbine 1 according an embodiment of the invention. Here, the wind turbine 1 comprises an overvoltage response arrangement 10 according to the invention. This is arranged to control a reactive power generating device 40 as well as a number of auxiliary devices 50, 51, 52. The reactive power generating device 40 in this case is a PWM filter of the wind turbine 1. The auxiliary devices 50, 51, 52 can be any of a lighting arrangement, cooling system, dehumidifier, etc. The overvoltage response arrangement 10 is provided with an overvoltage input signal 100 that indicates that an overvoltage event has occurred somewhere in the grid. This triggers the overvoltage response arrangement 10 to control as many devices as possible with the aim of reducing the level of reactive power being output by the wind turbine's local power system, and to increase the level of reactive power being absorbed by the wind turbine's local power system.

For example, the overvoltage response arrangement 10 can issue control signals to the auxiliary devices 50, 51, 52 to make these operate at or close to full rated power, so that these are operated to absorb as much reactive power as they can.

The overvoltage response arrangement 10 can also issue a control signal to a circuit breaker 40_S of the PWM filter 40, so that the PWM filter 40 is temporarily disconnected from the internal or local power system. In this way, its reactive power contribution is effectively eliminated from the local power system, thereby reducing the overall reactive power delivered by this wind turbine into the grid.

The overvoltage response arrangement 10 can also manipulate control parameters of the wind turbine generator 2. In this embodiment, the overvoltage response arrangement 10 can issue a control signal to the wind turbine's blade pitch system 20 to adjust the blade pitch angle in order to reduce the generator torque, with the effect of reducing the level of reactive power delivered into the system by the generator 2. To this end, any suitable information signal 101, for example the momentary blade pitch angle and/or torque level, may be provided to the overvoltage response arrangement 10 as a basis from which to generate the blade pitch angle control signal.

To control the devices in an appropriate manner, this embodiment of the overvoltage response arrangement 10 avails of a controller 12. Here, for the purposes of illustration, the controller 12 is shown as part of the overvoltage response arrangement 10, but it should be understood that such a controller 12 may in fact be realised as part of a wind turbine control system already incorporated in the wind turbine 1, for example in a main computer of the wind turbine 1.

The overvoltage response arrangement 10 can determine whether or not it will be able to provide a sufficiently effective response to the overvoltage event. Usually, this will be the case, since it is relatively unlikely that all auxiliary devices are already running at full power, and all reactive power generating devices are delivering their maximum reactive power levels, at the instant when an overvoltage event occurs. However, since it cannot be ruled out that an overvoltage response arrangement 10 can always provide a sufficiently effective response, an output signal 102 can indicate that external assistance is required. For example, an external inductor bank may be activated to absorb reactive power.

To decide which of the above measures to carry out, or whether all are required, the overvoltage response arrangement 10 comprises a power estimation unit 11 connected in turn to the wind turbine's low voltage bus. By monitoring or measuring the voltage level on this bus, the power estimation unit 11 can determine the capacity of the auxiliary devices 50, 51, 52 to absorb reactive power, and/or the amount of reactive power being fed into the system by the generator 2 and/or the PWM filter 40. The power estimation unit 11 can provide this information to the controller 12.

When a plurality of wind turbines 1 of a wind park are controlled in the manner described above, the net reactive power absorption in the grid should—in the majority of cases—be sufficient to provide a quick response to an overvoltage event, so that the wind turbines can remain connected to the grid to ensure that the grid voltage stabilizes as quickly as possible. However, to allow for a situation in which the local power network of a wind turbine 1 might—for whatever reason—still be threatened by damage during an overvoltage event, the wind turbine 1 can, as an additional safety measure, be equipped with a circuit breaker 1_S for disconnecting the wind turbine 1 from the grid.

Figure 3:
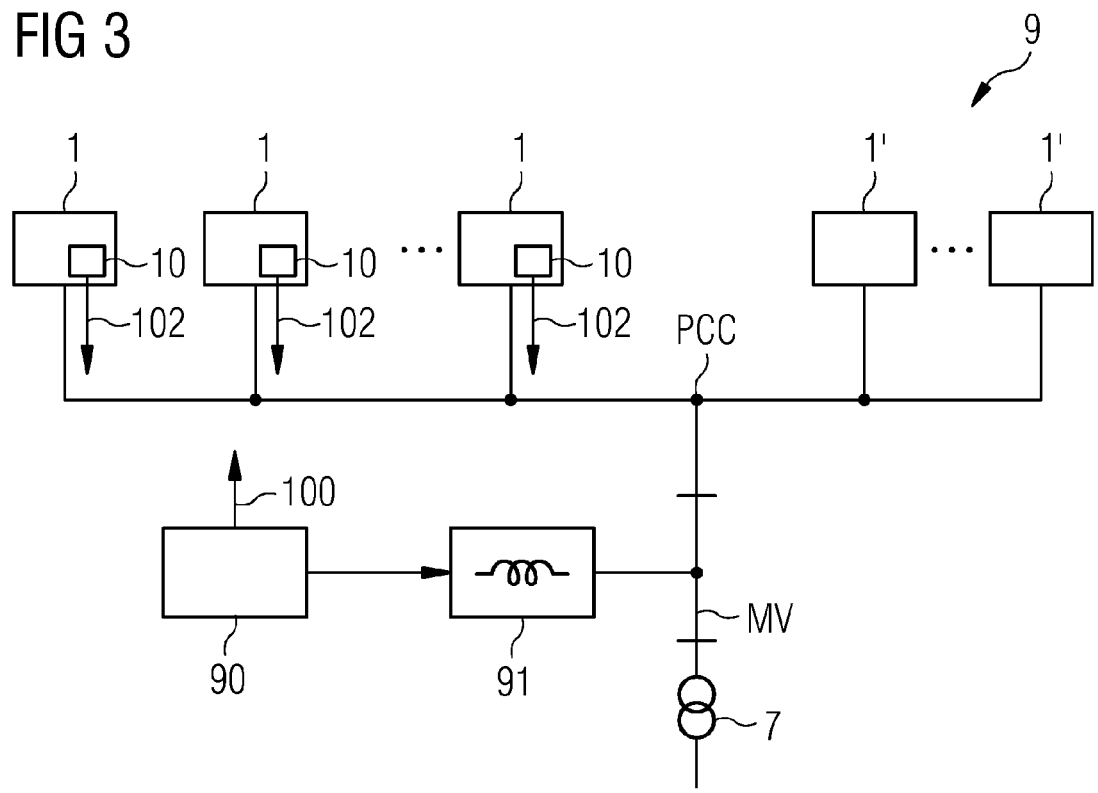
FIG. 3 shows a schematic representation of a wind park according an embodiment of the invention.

FIG. 3 shows a simplified schematic representation of a wind park 9 according to a first embodiment of the invention. Here, the wind park 9 comprises any number of wind turbines 1, 1' feeding into the park grid MV. Some wind turbines 1 are equipped with an overvoltage response arrangement 10 according to the invention, while other wind turbines 1' are not. The wind park 9 is controlled by a park controller 90. Such a park controller 90 can collect information from, and issue commands to, the wind turbines 1, 1'. For example, in the event of an overvoltage, a suitable signal such as the overvoltage input signal 100 is issued to all wind turbines 1 that are capable of reacting. These perform the steps described in the above to drive the wind turbines' auxiliaries to absorb reactive power, and to control the wind turbines' reactive power generating devices to reduce their reactive power output. For example, some or all of the PWM filters of those wind turbines 1 may be disconnected temporarily. The collective reaction of the wind turbines 1 may be sufficient to prevent tripping and disconnecting those wind turbines 1 and the other wind turbines 1'. However, if the overvoltage response arrangements 10 determine that the collective reaction will not be enough, the park controller 90 is informed, for example by the output signal 102 of one or more of the overvoltage response arrangements 10. The park controller 90 can respond by activating an inductor bank 91 to absorb the excess reactive power.

Figure 4:
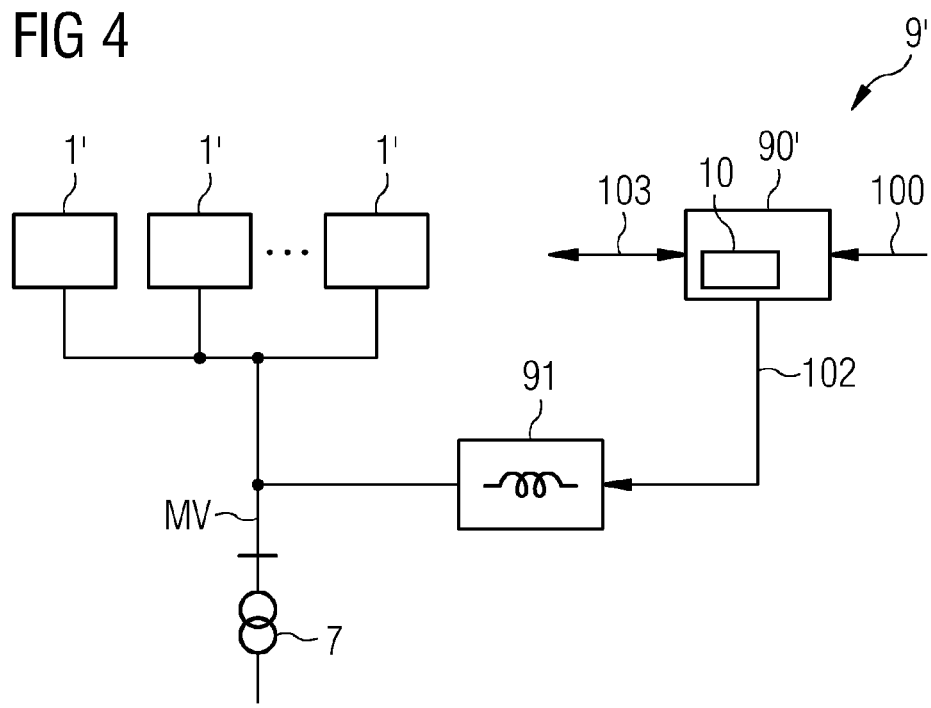
FIG. 4 shows a simplified schematic representation of a wind park according to a second embodiment of the invention.

FIG. 4 shows a simplified schematic representation of a wind park 9' according to a second embodiment of the invention. Here, the wind park 9' comprises a plurality of wind turbines 1' feeding into the park grid MV. In this embodiment, the wind park 9' is controlled by a park controller 90' realised to include the functions of an overvoltage response arrangement 10 according to the invention. The park controller 90' is connected over a data bus 103 with the main computers (not shown) of each wind turbine, so that the park controller 90' itself has access to all relevant data and can control the auxiliaries and reactive power generating devices of each wind turbine 1'. In the event of an overvoltage, for example as indicated by the overvoltage signal 100, the park controller 90' promptly carries out all actions that might reduce the reactive power generated by the individual wind turbines 1' and that might absorb reactive power by the auxiliary devices of the wind turbines 1'. Here also, if the information provided to or collected by the overvoltage response arrangement 10 indicates that these measures might not be sufficient to avoid tripping, an inductor bank 91 may be used to contribute to the overvoltage ride-through procedure.

Although the present invention has been disclosed in the form of preferred embodiments and variations thereon, it will be understood that numerous additional modifications and variations could be made thereto without departing from the scope of the invention. For example, any combination of the realisations shown in FIG. 3 and FIG. 4 may be considered.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of controlling a wind turbine in response to an overvoltage event in an electricity grid to which the wind turbine is connected, which method comprises:
   controlling at least one auxiliary device to increase its consumption of reactive power, wherein said auxiliary device comprises a device used for normal operation of the wind turbine; and
   controlling at least one reactive power generating device to decrease its generation of reactive power, wherein said at least one reactive power generating device comprises a device that generates reactive power for normal operation of the wind turbine.

2. The method according to claim 1, wherein the steps of controlling said at least one auxiliary device to increase consumption and of controlling said at least one reactive power generating device to decrease generation of reactive power are performed on the basis of a reactive power consumption capacity and a reactive power generation reduction capacity of said devices determined during normal operation of the wind turbine.

3. The method according to claim 1, further comprising activating an additional reactive power consumption device.

4. The method according to claim 1, wherein the method is performed to prevent a disconnection of the wind turbine from the grid.

5. The method according to claim 1, wherein said at least one auxiliary device and said at least one reactive power generating device are connected to a low-voltage bus of the wind turbine, and further comprising determining a reactive power absorption capacity of said auxiliary device on the basis of measuring a voltage at the low-voltage bus.

6. An overvoltage response arrangement adapted for controlling a wind turbine in response to an overvoltage event in an electricity grid to which the wind turbine is connected, which overvoltage response arrangement comprises:
   an overvoltage input for indicating an occurrence of an overvoltage event in the electricity grid;
   a controller for controlling at least one auxiliary device to increase its consumption of reactive power, wherein said at least one auxiliary device comprises a device used during normal operation of the wind turbine, and/or for controlling at least one reactive power generating device to decrease its generation of reactive power, wherein said at least one reactive power generating device comprises a device that generates reactive power during normal operation of the wind turbine; and
   a low-voltage bus and a plurality of reactive power consumption and/or generating devices connected to the low-voltage bus, said plurality including said at least one auxiliary device, wherein a power estimation unit of the overvoltage response arrangement determines the reactive power absorption capacity of said at least one auxiliary device of the wind turbine on the basis of a voltage measured at the low-voltage bus.

7. The overvoltage response arrangement according to claim 6, wherein the at least one reactive power generating device of the wind turbine comprises a PWM filter, and the overvoltage response arrangement is adapted to disconnect the PWM filter in response to the overvoltage event.

8. The overvoltage response arrangement according to claim 6, wherein the at least one auxiliary device of the wind turbine comprises any of: a pump of a cooling arrangement of the wind turbine, a dehumidifier of the wind turbine, and a lighting system of the wind turbine.

9. The overvoltage response arrangement according to claim 6, adapted to drive said at least one auxiliary device at essentially maximum power in response to the overvoltage event.

10. The overvoltage response arrangement according to claim 6, wherein the at least one reactive power generating device of the wind turbine comprises a wind turbine generator, and the overvoltage response arrangement is adapted to adjust a control parameter of the generator to reduce the reactive power output of the generator.

11. The overvoltage response arrangement according to claim 10, wherein the control parameter comprises a blade pitch angle, and the overvoltage response arrangement is adapted to decrease the blade pitch angle in response to the overvoltage event.

12. A wind park comprising
    a plurality of wind turbines connected to an electricity grid;
    a wind park controller for controlling the plurality of wind turbines;
    wherein the wind park comprises an overvoltage response arrangement according to claim 5 adapted to control a number of said at least one auxiliary device of a number of the wind turbines to increase their consumption of reactive power and/or to control a number of said at least one reactive power generating device of a number of the wind turbines to decrease their generation of reactive power in response to an overvoltage event in the electricity grid.

13. An overvoltage response arrangement adapted for controlling a wind turbine in response to an overvoltage event in an electricity grid to which the wind turbine is connected, which overvoltage response arrangement comprises:
    an overvoltage input for indicating an occurrence of an overvoltage event in the electricity grid; and
    a controller for controlling at least one auxiliary device to increase its consumption of reactive power, wherein said at least one auxiliary device comprises a device used during normal operation of the wind turbine, and/or for controlling at least one reactive power generating device to decrease its generation of reactive power, wherein said at least one reactive power generating device comprising a pulse width modulation (PWM) filter, and the overvoltage response arrangement is adapted to disconnect the PWM filter in response to the overvoltage event.

14. The overvoltage response arrangement according to claim 13, further comprising a low-voltage bus and a plurality of reactive power consumption and/or generating devices connected to the low-voltage bus, including said at least one auxiliary device, wherein a power estimation unit of the overvoltage response arrangement determines the reactive power absorption capacity of an auxiliary device of the wind turbine on the basis of a voltage measured at the low-voltage bus.

15. The overvoltage response arrangement according to claim 13, further comprising a power estimation unit for determining a reactive power absorption capacity of said at least one auxiliary device of the wind turbine during normal operation of the wind turbine.

16. The overvoltage response arrangement according to claim 13, further comprising a power estimation unit for determining a reactive power generation capacity of said at least one reactive power generating device of the wind turbine during normal operation of the wind turbine.

17. The overvoltage response arrangement according to claim 13, wherein the at least one auxiliary device of the wind turbine comprises any of: a pump of a cooling arrangement of the wind turbine, a dehumidifier of the wind turbine, a lighting system of the wind turbine.

18. The overvoltage response arrangement according to claim 13, adapted to drive said at least one auxiliary device at essentially maximum power in response to the overvoltage event.

* * * * *